March 17, 1970     G. SANDSTEDE ET AL     3,500,675
APPARATUS FOR AN AUTOMATIC GRAVIMETRIC RECORDING OF
CHARACTERISTIC CURVES WHICH REPRESENT
THE SORPTION OF GAS BY A SAMPLE Filed June 20, 1968     2 Sheets-Sheet 1

INVENTORS
GERD SANDSTEDE
ERICH ROBENS

BY Edmund M. Jaskiewicz
ATTORNEY

INVENTORS
GERD SANDSTEDE
ERICH ROBENS

BY Edmund M. Jaskiewicz
ATTORNEY

United States Patent Office 3,500,675
Patented Mar. 17, 1970

3,500,675
APPARATUS FOR AN AUTOMATIC GRAVIMETRIC RECORDING OF CHARACTERISTIC CURVES WHICH REPRESENT THE SORPTION OF GAS BY A SAMPLE
Gerd Sandstede and Erich Maria Robens, Frankfurt am Main, Germany, assignors to Sartorius-Werke, GmbH (und vormals Gottinger Prazisionswaagenfabrik, GmbH), Gottingen, Germany, a corporation of Germany
Filed June 20, 1968, Ser. No. 738,525
Claims priority, application Germany, June 20, 1967, 1,623,097
Int. Cl. G01n 5/02, 7/04
U.S. Cl. 73—19                22 Claims

ABSTRACT OF THE DISCLOSURE

An evacuable sorption vessel adapted to contain a sample contains an electric sorption balance, which is adapted to measure the mass of sorbate taken up by said sample. Control means are provide to selectively maintain any one of the three variables consisting of said mass of sorbate, gas pressure in said sorption vessel, and temperature in said sorption vessel constant as a first variable and for adjusting any of the variables consisting of said gas pressure and said temperature as a second variable in succession to a plurality of different values within a selected range. Said control means comprise a supply container for holding said gas under superatmospheric pressure, a high-vacuum pump having an inlet and an outlet, at least one electrically operable outlet valve rigidly connected between said sorption vessel and said inlet of said high vacuum pump, a backing pump, a first flexible tube connecting said outlet of said high-vacuum pump to said backing pump, a gas supply conduit connected to said container, a second flexible tube connecting said sorption vessel to said gas supply conduit, electrically operable inlet valve means connected between said container and said sorption vessel and a gas pressure-setting device adapted to control said inlet and outlet valve means. The apparatus further comprises measuring means for measuring any one of said variables as a third variable and including said sorption balance. Said apparatus also comprises means for recording said second and third variables and a vibration-damped mounting. The sorption vessel and the high-vacuum pump are rigidly carried by said mounting.

---

Figure 1A:
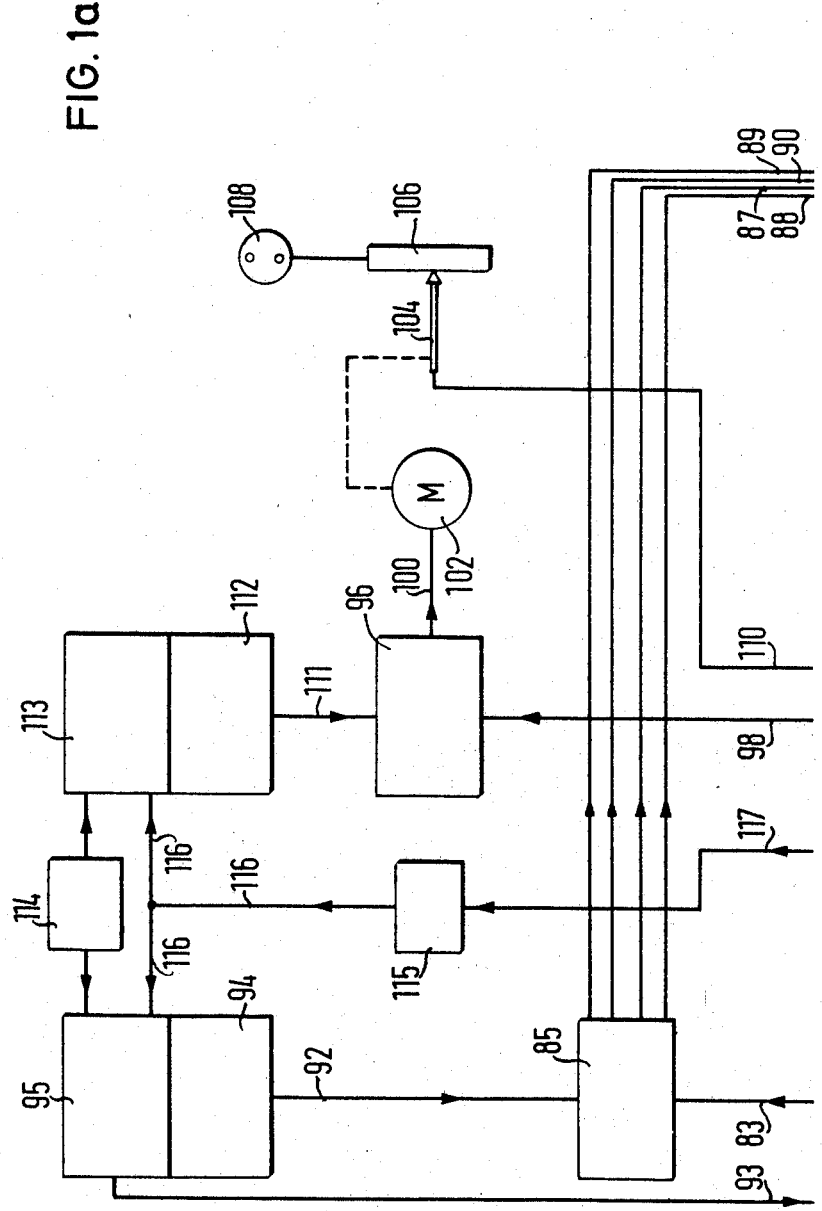

This invention relates to apparatus for an automatic gravimetric recording of charactistic curves which represent the gas sorption by a sample, which is accommodated in an evacuable sorption vessel, which apparatus comprises an electric balance (sorption balance) which is accommodated in the sorption vessel and serves to measure the mass of sorbate taken up by the sample, and devices for measuring the gas pressure in the sorption vessel and the temperature in the sorption vessel, one of the three variables (mass of sorbate, gas pressure, temperature) being held constant, the pressure or temperature being adjusted to a plurality of values within an interesting range, and recorded, and the coordinate third variable being measured and recorded.

Such apparatus is known from the German patent specification No. 1,129,734. The recorded characteristic curves may be isotherms, isobars or isosters. For recording an isotherm, the temperature in the chamber containing the sample is maintained constant and the pressure in the chamber containing the sample is varied within an interesting range; this variation may be continuous or intermittent and may be program-controlled. The mass of sorbate which is coordinated with the several pressure values is measured and recorded. To record an isobar, the pressure in the chamber containing the sample is maintained constant, the temperature is varied and the coordinated mass of sorbate is determined. To record an isoster, the mass of sorbate is maintained constant, the temperature, e.g., is varied, and the ascociated pressure values are determined.

A gravimetric measurement, i.e. a measurement of the mass of sorbate by a balance, is more accurate than other known methods because the mass of sorbate is not determined from other variables but is weighed directly.

Owing to the very small change of mass to be weighed, the electric balance together with the sorption vessel must have a shock-free mounting. Vibration dampers may be used for this purpose. In the known apparatus according to said German patent specification, the sorption vessel is connected by one or more long, flexible tubes to the associated units so that shocks will not be transmitted to the sorption vessel. The associated units include a pressure gage as well as valve-connected devices for supplying and withdrawing gas and for regulating the pressure.

Only pressures in excess of 1 mm. mercury can be controlled in such an arrangement. The flexible tubes connected to the sorption vessel prevent the establishment of a good vacuum even if a good high-vacuum pump is employed. These tubes must resist the atmospheric pressure and for this reason must have a certain stiffness. On the other hand they must have the necessary resiliency to keep shocks from the sorption vessel and the balance. If the tubes are made thin so that they have the required elasticity, their small cross-section prevents an adequate evacuation. If the tubes have a larger cross-section, they must be of considerable length so that the pumping action is also highly adversely affected.

It is an object of the invention to provide an apparatus of the kind mentioned first hereinbefore which is designed so that sorption characteristic curves can be recorded also in the range below 1 mm. mercury. This is accomplished according to the invention in that the sorption vessel (which contains the sorption balance) and a high-vacuum pump are rigidly secured to a stand, which is carried by a vibration-damped mounting, the sorption vessel is rigidly connected to the inlet of the high-vacuum pump by at least one electrically operable outlet valve the outlet of the high-vacuum pump is connected by a flexible tube to a backing pump, the sorption vessel is connected by another flexible tube to a gas inlet conduit, and the device for adjusting the gas pressure communicates with at least one electrically operable inlet valve, which is connected between a container for holding pressurized gas for use in the measurement, and with at least one of said electrically operable outlet valves, which is connected between the sorption vessel and the pumps.

As the high-vacuum pump is mounted on the stand of the sorption vessel, the pump can be directly connected to the sorption vessel so that the flexible tubes between the two units are eliminated. A valve must be connected between these units but may have a large free cross-section. No grease is required in the junctions between the sorption vessel, valve, and high-vacuum pump. For instance, it is not required to use ground glass joints or ground glass plugs sealed with plug grease. Seals of rubber-elastic materials can also be avoided. It is not necessary to allow for the fat that some gases to be measured may be dissolved in the sealing material so that the measurement will be disturbed.

In the apparatus according to the above-mentioned German patent specification, mercury pressure gages are used for measuring pressure. At room temperature, mercury has a vapor pressure of $10^{-3}$ millimeters mercury so that the gas used in the measurement and the sample material must consist of substances which do not react with mercury vapor.

To eliminate this disadvantage, it is another feature of the invention to use a mercury-free pressure gage for measuring pressure. To this end, the sorption vessel may accommodate an electric balance which has a measuring system that is biased by a buoyant body so that the pressure can be determined by a measurement of buoyancy. Alternatively, a diaphragm pressure gage having an electrical output may be accommodated in the sorption vessel.

Figure 1B:
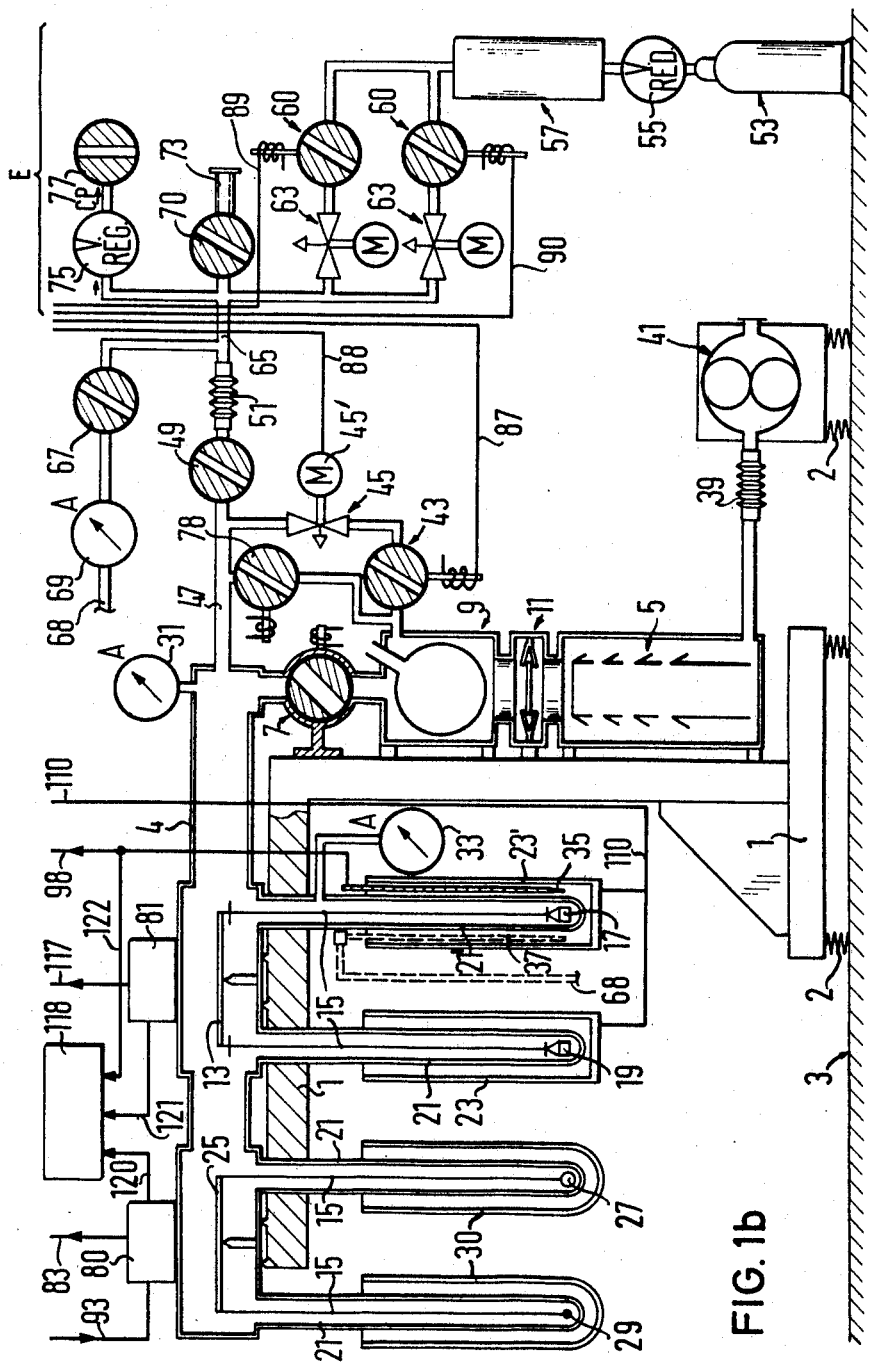

An illustrative embodiment of the invention will be described hereinafter with reference to the drawing. (FIGS. 1a and 1b).

A stand 1 is mounted in known manner with the aid of vibration dampers 2 on a support 3. A sorption vessel 4 and a high-vacuum pump 5 are rigidly secured to the stand 1. Three additional devices are disposed between the units 4 and 5 and are connected by short, rigid, wide pipes to the sorption vessel and the high-vacuum pump and to each other. These units include the main valve 7, which is to be connected to the sorption vessel, and which has a flow passage which is at least 50 mm. in diameter; this valve consists of a gently closing solenoid valve and is succeeded by a nitrogen-cooled trap 9. A baffle 11 which is thermoelectric or cooled with the aid of a refrigerator is connected between the trap 9 and the inlet of the high-vacuum pump 5. Whereas rubber-elastic materials may be used as sealing material between the pipes and parts 4, 7, 9, 11, it is preferable to use metals for this purpose, such as indium or gold.

The sorption balance 13 for measuring the mass of sorbate is accommodated in the sorption vessel 4 and consists preferably of a two-armed electromagnetic microbalance arranged to compensate the inclination of the beam. The sample 17 is suspended by wires 15 from one end of the balance beam. A counterweight 19 consisting of a compact material having about the same density as the sample is suspended with wires 15 from the other end of the balance beam.

The sample and the counterweight are vacuum-tightly enclosed by extensions 21', 21 of the sorption vessel 4. The extensions enter heating devices 23', 23, which serve to produce and maintain predetermined temperatures adjacent to the sample and counterweight, respectively. The heating devices may be replaced by Dewar vessels. In this case, the temperature in the extensions 21' and 21 can be varied in the range from +1200° C. to −200° C.

A buoyancy balance 25 is provided for measuring the pressure in the sorption vessel. This balance is of the same kind as the balance 13. It carries at one end of its balance beam a buoyant body 27, preferably a gas-tightly sealed glass bulb, and at the other end of the balance beam a counterweight 29 of compact material having a high density. The buoyant body and the counterweight are again suspended by wires 15 and disposed in extensions 21 of the sorption vessel. The extensions are surrounded by thermostat vessels 30, preferably with Dewar vessels filled with ice water. Instead of the Dewar vessels, heating devices may be used, which are energized with a current, which is controlled in the same manner as the current fed to the heating devices 23' and 23 of the sorption balance. This control will be described hereinafter.

A diaphragm pressure gage may be used instead of the buoyancy balance 25. In either case, the pressure gage has an electrical output. Two pressure gages consisting preferably of ionization gages 31 and 33 are provided to measure the vacuum in the sorption vessel.

A thermometer 35 having an electrical output, preferably a thermocouple or a resistance thermometer, is provided to measure the temperature within the thermostat 23' which surrounds the sample 17.

The high-vacuum pump 5 consists preferably of an oil diffusion pump or a turbomolecular pump and is connected by a flexible tube 39 to a backing pump, 41, which is separately supported by vibration dampers 2. The cold trap 9 is connected by a solenoid valve 43 and a needle valve 45, which is operated by a motor 45', to a conduit 47, which communicates with the sorption vessel but may have a relatively small cross-section. The needle valve continuously increases its free cross-section until the desired pressure has been reached in the sorption vessel 4. The needle valve is then closed; this closing takes some time. The solenoid valve 43 enables an instantaneous closing of the gas outlet when the desired pressure has been reached. The right-hand end of the conduit 47 can be shut off by a manual valve 49, which is connected on the right by a flexible metal tube 51 to the gas inlet part E of the plant.

The gas inlet part E contains a high-pressure bomb 53 for the gas used in the measurement. The gas flows in succession through a reducing valve 55 and a cleaning and drying device 57 to two parallel flow paths consisting each of a solenoid valve 60 and a needle valve 63. The needle valves 63 are connected by a conduit 65 to the tube 51.

A thin tube 68, which is closed at its end, and a diaphragm pressure gage 69 are connected by a manual valve 67 to the conduit 65. The tube can be filled with the gas to be used in the measurement and serves as a sensing probe in calibrating the electric thermometer 35.

To this end the sensing probe 68 is filled under superatmospheric pressure with the gas to be used in the measurement and is introduced into the Dewar vessel provided instead of the heating device 23'. The valve 67 is closed at this time. The pressure measured by the pressure gage 69 may then be used in calculating the temperature which prevails in the sensing probe 68 and in calibrating the electric thermometer.

To calibrate the buoyancy scale, valves 49 and 67 are opened. The pressure gage 69 now measures the pressure in the sorption vessel 4.

The conduit 65 is connected by a manual valve 70 to a connecting pipe 73, which enables an introduction of gases to be used in the measurement, particularly in the form of vapors of substances which are liquid at room temperature.

The conduit 65 is also connected to a relief valve 75, which can be shut off by a manual valve 77, particularly when the sensing probe 68 must be filled under superatmospheric pressure.

Pressure gages, not shown, are provided at various points of the plant.

One of the two needle valves 63 is opened to a larger extent and the other to a smaller extent so that the solenoid valves 60 can be electrically actuated to admit gas at a higher or lower rate through conduits 65 and 47 into the sorption chamber 4 when the pressure therein is to be increased. To reduce the pressure from a high value, the needle valve 45 and the solenoid valve 43 are operated. To reduce the pressure from a very low value, the main valve 11 is operated. For pressures in an intermediate range, a further solenoid valve 78 which is smaller in cross-section than valve 7 may be connected in parallel thereto. In this case, the pumps suck gas from the sorption chamber 4 through one of the now open flow paths.

The cold trap 9 and the baffle 11 are cooled only when very low pressures must be produced in the sorption chamber 4. Under higher pressures, when the main valve 7 is closed and evacuation is effected from time to time through the valves 43 and 45 or through the valve 78, the cold trap and baffle are cleaned during said evacuation by the gas flowing through them to remove vapors which have condensed in said elements 43 and 45, particularly oil vapors originating in the high-vacuum pump 5.

The electrical control devices for an automatic recording of the sorption characteristic curves are diagrammatically shown in FIG. 1, in which electrical connections are represented only by one line even where go and return wires are required.

The electric measuring systems of the buoyancy scale 25 and of the sorption scale 13 are indicated at 80 and 81, respectively. The measuring system 80 is connected by a lead 83 to a pressure controller 85, preferably an automatic pressure controller. Four leads 87 to 90 lead from the pressure controller 85 to the solenoid valve 43, the motor 45' of the needle valve 45 and the two solenoid valves 60. For the sake of clearness, the four leads 87 to 90 are shown interrupted at B. Additional connections may be provided to the main valve 7 and the solenoid valve 78.

The pressure controller 85 is also connected by a lead 92 to a device 94 for a program control of pressure. This device is connected to a stepping mechanism 95 for the pressure values to be set, e.g., a motor-operated decade stepping device for one hundred steps. The device 95 is also connected by a lead 93 to the measuring system 80 of the buoyancy balance 25.

A temperature controller 96 is connected by a lead 98 to the electric thermometer 35 and by a lead 100 to a positioning motor 102, which mechanically operates a tap 104 of a resistor 106. Current flows from a source 108 through the tapped part of the resistor 106 and a lead 110 to the heating devices 23, 23' and from the latter through leads, not shown, back to the other end of the source of current. The resistor 106 may be replaced by a tapped transformer which is operated by the motor 102.

The temperature controller 96 is also connected by a lead 111 to a device 112 for program-controlling the temperature. The device 112 is provided with a stepping mechanism 113, which may comprise one or more motor-operated camwheels for setting the device 112 to different values in a predetermined pattern to vary correspondingly the output at the controller 96.

The two stepping mechanisms 95 and 113 may be connected to a timer 114, which produces output signals to advance each stepping mechanism one step.

The measuring system 81 of the sorption balance 13 is connected by a lead 117 to a device 115 which gives an indication when the weight reading of the measuring system 81 is constant. The device 115 then applies through leads 116 a control signal to the stepping mechanisms 95 and 113.

A recorder 118 is connected by leads 120–122 to the measuring system 80 of the buoyancy balance, the measuring system 81 of the sorption balance, and the electric thermometer 53.

When it is desired to maintain a predetermined pressure in the sorption vessel 4, the pressure program controller 94 applies via the stepping mechanism 95 and via lead 93 to the measuring system 80 of the buoyancy balance 25 a desired pressure signal in the form of a compensating current which corresponds to the desired pressure. If the desired pressure prevailed in the sorption vessel 4, the compensating signal would oppose the buoyancy and would just keep the balance in equilibrium. The balance will normally be unbalanced initially. An actual-pressure signal is applied via lead 83 to the pressure controller; this signal corresponds to the pressure which actually prevails in the sorption vessel. At the same time, the pressure program controller 94 applies via lead 92 to the pressure controller 85 a desired-pressure signal, which corresponds to the pressure to be adjusted. In accordance with the difference between the actual- and desired-pressure signals, the controller 85 controls the inlet and/or outlet valves by one or more of the leads 87 to 90. When the pressure is insufficient, the pressure controller opens one of the solenoid valves 60 so that the pressure in the sorption vessel 4 is increased (the manual valve 49 is open). When the pressure is excessive, the pressure controller operates the two valves 45 and 43 so that gas is sucked from the sorption vessel 4.

When the corect pressure has been adjusted, the sample 16 takes up an associated amount of the gas used for the measurement. After some time, the sorption balance gives a constant reading. The recorder 118 then records the coordinated values of pressure, mass of sorbate, and temperature. The next pressure value can then be adjusted.

To adjust a predetermined, desired temperature, the temprature program controller 112 applies a desired-temperature signal to the temperature controller 96. The temperature controller receives an actual-temperature signal from thermometer 35 via lead 98 and applies to the positioning motor 102 a signal corresponding to the difference between the desired-temperature and actual-temperature signals. The positioning motor 102 adjusts the tap 104 on the resistor 106 so that more or less current is fed to the heating devices 23 and 23' until the desired- and actual-temperature signals are equal and the desired temperature has been reached.

The recorder 118 then records the three coordinated values of pressure, mass of sorbate, and temperature, and the next temperature value is subsequently set.

The program controllers 94 and 112 are set by the associated stepping mechanisms 95 and 113, respectively, to the respective next desired values. Each step is initiated by a pulse, which is delivered by a timer 114 or by the device 115. The device 115 delivers such pulse when the output signal delivered by the measuring system 81 to the lead 117 has become constant to indicate that the mass of sorbate has become constant.

For an automatic recording of a sorption isotherm, the temperature controller 96 maintains a constant temperature. The pressure program controller 94 and the pressure controller 85 adjust the pressure in the sorption chamber 4 in succession to several different values. The coordinated values of the mass of sorbate are measured and the pressure values and mass readings are recorded by the recorder 118. For a recording of a sorption isobar, the pressure controller maintains a constant pressure in the sorption chamber. The temperature program controller 112 and the temperature controller 96 are operated to adjust the temperature in the extensions 21 and 21' of the sorption vessel 4 in succession to several different values. The temperature values and the coordinated mass readings are recorded by the recorder 118.

For a recording of an isoster, as has been described hereinbefore, the pressure or temperature are adjusted successively to various values. The coordinated variable, temperature or pressure, is then changed until the mass of sorbate has again assumed the constant value which is significant for the isoster. By means of the device 115, the respective stepping mechanism 95 or 113 is then operated to adjust the pressure or temperature to the next value.

With the aid of special switching devices, not shown, the stepping mechanisms 95 and 113 may be controlled to regularly skip certain pressure or temperature values, e.g., so as to adjust only every other pressure or temperature value. This skipping may be effected only within a certain range of pressure or temperature whereas the pressure or temperature is adjusted to each value within another range. Other switching devices may be used to perform the program in the opposite direction and to terminate the program.

What is claimed is:

1. An apparatus for an automatic gravimetric recording of characteristic curves which represent the absorption of gas by a sample, and comprising a vibration-damped mounting stand for resting upon a support surface;

an evacuable sorption vessel for containing a sample rigidly mounted on said stand;

an electric sorption balance in said sorption vessel to measure a mass of sorbate taken up by said sample;

a high-vacuum pump having an inlet and outlet rigidly mounted on said stand;

outlet valve means rigidly connected between said sorption vessel and said vacuum pump inlet;

a backing pump;

a first flexible connection between the outlet of said high-vacuum pump and said backing pump;

control means for selectively maintaining any one of the three variables consisting of said mass of sorbate, gas pressure in said sorption vessel, and temperature in said sorption vessel constant as a first variable and for adjusting any of the variables consisting of said gas pressure and said temperature as a second variable in succession to a plurality of different values within a selected range;

said control means comprising
a source of gas under super-atmospheric pressure;
a second flexible connection between said gas source and said sorption vessel,
inlet valve means between said gas source and said sorption vessel, and a gas pressure-setting device for controlling said inlet and outlet means;
means for measuring any one of said variables as a third variable and including said sorption balance; and
means for recording said second and third variables.

2. Apparatus as set forth in claim 1, in which said outlet valve means has a large free cross section of at least 50 millimeters in diameter.

3. Apparatus as set forth in claim 1, in which said measuring means comprise an electric buoyancy balance to measure said pressure and having a measuring system and a buoyant body which biases said measuring system.

4. Apparatus as set forth in claim 3, in which
said means for measuring said temperature comprise an electric thermometer, and which comprises a pressure gage,
a sensing probe consisting of a tube which is connected to said pressure gage and adapted to be filled with said gas, and
valve means connecting said tube to said container,
said pressure gage being adapted to be used in calibrating said buoyancy balance and said electric thermometer.

5. Apparatus as set forth in claim 1, in which said measuring means comprise a diaphragm pressure gage having an electrical output to measure said pressure.

6. Apparatus as set forth in claim 1, in which said inlet valve means comprise at least one series connection of an electrically operable solenoid valve and a metering valve.

7. Apparatus as set forth in claim 1, in which said inlet valve means comprise two parallel-connected series connections of an electrically operable solenoid valve and a metering valve.

8. Apparatus as set forth in claim 1, in which said outlet valve means comprise a series connection of an electrically operable solenoid valve and an electrically controlled metering valve.

9. Apparatus as set forth in claim 1, in which said pressure-setting device comprises
a pressure gage for measuring said pressure and
a pressure controller adapted to be set to a selected pressure and to control said inlet and outlet valve means in response to said pressure gage until said pressure in said sorption vessel has been adjusted to said selected pressure.

10. Apparatus as set forth in claim 9, in which said pressure controller is an automatic pressure controller.

11. Apparatus as set forth in claim 1, in which said control means comprise
an electric thermometer in heat transfer relation to the interior of said sorption vessel,
an electric heater in heat transfer relation to the interior of said sorption vessel,
adjusting means for varying the output of said electric heater and
a temperature controller adapted to control said adjusting means in response to said electric thermometer.

12. Apparatus as set forth in claim 11, in which said temperature controller is an automatic controller.

13. Apparatus as set forth in claim 11, in which said adjusting means comprise a rheostat in circuit with said heater and a positioning motor for varying the effective resistance of said rheostat under the control of said controller.

14. Apparatus as set forth in claim 11, in which said adjusting means comprise a variable transformer in circuit with said heater and a positioning motor for varying the output voltage of said transformer under the control of said controller.

15. Apparatus as set forth in claim 1, in which said pressure-setting device comprises
a pressure gage for measuring said pressure and
a pressure controller adapted to be set to a selected pressure and adapted to control said inlet and outlet valve means in response to said pressure gage until said pressure in said sorption vessel has been adjusted to said selected pressure,
said control means further comprise
an electric thermometer in heat transfer relation to the interior of said sorption vessel,
an electric heater in heat transfer relation to the interior of said sorption vessel,
adjusting means for varying the output of said electric heater and
a temperature controller adapted to control said adjusting means in response to said electric thermometer, and
said control means also comprise
an automatic pressure program controller for setting said pressure controller successively to different selected pressure values in accordance with a predetermined program, and
an automatic temperature controller for setting said temperature controller successively to different desired temperature values in accordance with a predetermined program,
each of said automatic program controllers including a stepping device for setting said values.

16. Apparatus as set forth in claim 15, in which each of said stepping devices comprises a cam mechanism.

17. Apparatus as set forth in claim 15, which comprises an electric timer for initiating successive steps of said stepping mechanism.

18. Apparatus as set forth in claim 15,
which comprises means for delivering a stepping signal when said sorption balance indicates a constant weight,
said stepping mechanism being arranged to perform a step in response to said stepping signal.

19. Apparatus as set forth in claim 18 wherein said stepping signal delivery means comprises a differentiation circuit.

20. Apparatus as set forth in claim 15, which comprises means adapted to cause each of said stepping mechanisms to skip predetermined positions, to reverse each of said stepping mechanisms and to terminate the operation of said stepping mechanisms.

21. Apparatus as set forth in claim 1, which comprises a cold trap and a baffle rigidly connected to and between said high-vacuum pump and said main valve.

22. Apparatus as set forth in claim 1, which comprises a reducing valve connected between said container and said inlet valve means and serving for a coarse adjustment of a reduced pressure.

References Cited

UNITED STATES PATENTS 2,692,497  10/1954  Nordstrand.
1,707,822  4/1929  Stock _____ 73—30

OTHER REFERENCES

Bowers et al.: Review of Scientific Instruments, vol. 26, No. 4, April 1955, pages 337–341.

S. CLEMENT SWISHER, Primary Examiner

U.S. Cl. X.R.

73—432